United States Patent

[11] 3,584,156

[72] Inventor Ronald V. Beth
Reynoldsburg, Ohio
[21] Appl. No. 773,384
[22] Filed Nov. 5, 1968
[45] Patented June 8, 1971
[73] Assignee Bell Telephone Laboratories, Incorporated
Murray Hill, Berkeley Heights, N.J.

[54] TELEPHONE SWITCHING CIRCUIT WITH CALL-WAITING SERVICE
21 Claims, 13 Drawing Figs.

[52] U.S. Cl. .......... 179/18BG
[51] Int. Cl. .......... H04m 3/48
[50] Field of Search .......... 179/27.2 C, 84 B, 18.19, 18.01, 18.03

[56] References Cited
UNITED STATES PATENTS
3,355,555 11/1967 Thelemaque .......... 179/18.19
3,381,095 4/1968 Baker et al .......... 179/27.2C
3,458,662 7/1969 Hayes et al. .......... 179/18ES

*Primary Examiner*—Kathleen H. Claffy
*Assistant Examiner*—David L. Stewart
*Attorneys*—R. J. Guenther and James Warren Falk

ABSTRACT: A telephone switching system is arranged to provide the call-waiting special service feature without requiring the preassignment of an additional network line appearance. A plurality of call-waiting special service circuits is provided each with a single network appearance which is connected through to a special service line when the line is in a busy condition and a subsequent incoming call is directed thereto. The common control marker circuit is arranged to replace the previously registered information, identifying the called station, with the identification information of a selected call-waiting circuit and to thereupon complete the incoming connection to the call-waiting circuit line appearance. The privileged station may thereafter control the call-waiting feature in the normal prior art manner.

INVENTOR
R. V. BETH
BY [signature]
ATTORNEY

PATENTED JUN 8 1971 3,584,156

SHEET 04 OF 12

TELEPHONE SWITCHING CIRCUIT WITH CALL-WAITING SERVICE

BACKGROUND OF THE INVENTION

1. Field of the Invention

This invention relates generally to telephone switching systems, and particularly to switching network arrangements within such systems wherein each special service station requires a plurality of network appearances to perform a special service function. More particularly, this invention pertains to switching networks wherein each special service station is arranged for operation without requiring the preassignment of more than one such network appearance and wherein an additional network appearance and associated special service line circuitry is associated with the special service station only when a special service function is to be performed.

2. Description of the Prior Art

Extensive development of telephone switching systems in recent years has made possible the provision of numerous special features which render telephone service more convenient and more flexible. For example, circuit arrangements have been provided to enable a special service subscriber currently engaged in a telephone conversation to be advised via an audible call-waiting signal that another call has been directed to his line. The provision of features such as call-waiting requires more than one line appearance per special service station in the associated switching network. In consequence, the ever increasing demand for such features, with the attendant preassignment of an auxiliary line appearance per feature, places an economic burden upon central office facilities. This is particularly unsatisfactory in view of the fact that such features are often exercised infrequently.

An arrangement disclosed in M. E. Krom, U.S. Pat. No. 3,320,367 issued May 16, 1967, provided a partial solution to the problem by combining the call-waiting feature with another special service feature in one switching circuit. Although the Krom arrangement presents a significant improvement over the prior art by reducing the number of line appearances required for special service features, the requirement still remained for at least one additional preassigned line appearance per special service station.

As the demand for call-waiting and similar features continued to increase, it was evident that there was a need for an arrangement which eliminated the requirement for a preassigned additional line appearance. Such an arrangement is set forth in U.S. Pat. No. 3,377,433 issued Apr. 9, 1968 to W. Whitney wherein a plurality of special service switching circuits are provided, each of which has a single output appearance and a pair of input appearances. Upon the offhook condition of a special service station, a control circuit complete a connection from the permanent input appearance of the station via the switching network to the output appearance of an available special service switching circuit. The pair of input (line) appearances of the selected switching circuit then functions so as to provide special service features for incoming and outgoing connections to the special service station.

While the Whitney arrangement is a substantial improvement over the prior art in that it requires no additional preassigned line appearances per special service station, it does require that the station occupy a special service switching conduit and five switching network appearances each time it is active, whether or not the special service function is required. A special service switching circuit which is selected each time a special service station goes off-hook is obviously not available for use by other special service customers until the selecting station is idle again. As the demand for such features increases, it is evident that there is a need for an arrangement which eliminates the enabling of a special service switching circuit for the entire time of each connection to a special service station whether or not the special service function is required. An arrangement whereby a special service circuit is only enabled when a special service station requires the particular special service would affect substantial economy by allowing fewer special service switching circuits to serve the same number of special service stations, and would simultaneously substantially lessen the present quantity of preassigned line appearances necessary to provide such services.

SUMMARY OF THE INVENTION

An object of the invention is to provide a network arrangement wherein a special service switching circuit is enabled to provide an auxiliary network line appearance for a special service station only when the special service is required by the station. In one embodiment of the invention, an auxiliary line circuit is associated with each special service station and is operable to detect and register a busy condition of the associated station and also to recognize when another incoming call has been directed thereto. Thus, the auxiliary line circuit is enabled when an attempt is made by the switching system to establish a second connection to a special service station line to which a connection has already been established. The auxiliary line circuit thereupon enables control means which selects an idle call-waiting switching circuit and directs the incoming connection to the line appearance of the selected call-waiting switching circuit. The control means then enables an auxiliary linkage connection between the call-waiting circuit and the special service station line associated with the energized auxiliary line circuit. A call-waiting signal is then impressed upon the special service station line through the auxiliary linkage path and the special service station may thereafter control the call-waiting feature in the well-known prior art manner. In the event the special service station returns to an on-hook state prior to responding to the waiting call, the switching circuit is arranged to apply ringing potential to the line.

BRIEF DESCRIPTION OF THE DRAWING

The nature of the present invention and its various advantages will appear more fully by referring to the following detailed description in conjunction with the appended drawings in which.

Figure 1:
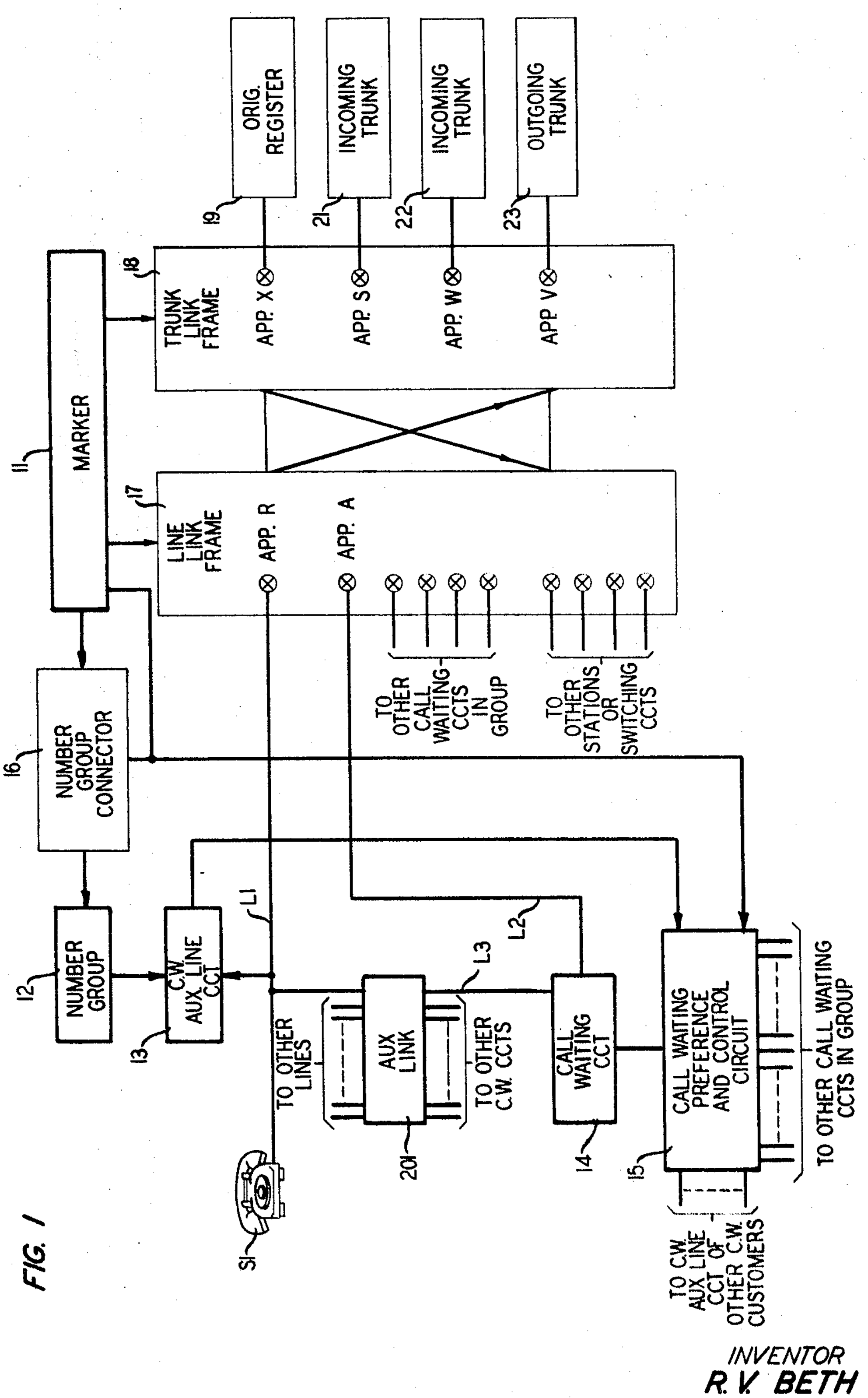
FIG. 1 is essentially a block diagram showing the interrelationship of the exemplary embodiment.

It will be noted that FIGS. 2 through 12 employ a type of notation referred to as "detached contact" in which an "X" represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the Sept. 1955 publication of the American Institute of Electrical Engineers Transactions, Communications and Electronics, Vol. 74, pp. 505—513.

The present invention may be advantageously incorporated in an automatic telephone system wherein common control circuits are employed to control the establishment of calls through a switching network. One such system is disclosed in the A.J. Busch U.S. Pat. No. 2,585,904, issued Feb. 19, 1952. It is to be understood, however, that the present invention is not limited to use in a telephone system of this type but may be utilized in other types of switching systems.

The invention is described herein as being embodied in a telephone system of the type disclosed in the cited Busch patent. The invention is particularly concerned with apparatus in the marker circuit 11, the number group circuit 12, a call-waiting auxiliary line circuit 13, a call-waiting circuit 14, auxiliary link circuit 201, and a preference and control circuit 15, which are represented by the blocks shown with heavy lines in FIG. 1. Equipment units in the Busch system other than the marker 11, the number group 12, and the number group connector 16 are neither shown nor described in detail herein except where necessary for a complete understanding of the invention. The cited Busch patent may be consulted where desired for a more complete understanding of the construction and operation of components not covered in detail herein and, for purposes of illustration, it is intended that the apparatus of the line link frame 17, the trunk link frame 18, the originating register 19, incoming trunks 21 and 22, and outgoing trunk 23 be similar to the corresponding apparatus disclosed in the Busch patent.

The interrelationship and function of the equipment units of the exemplary embodiment will now be described with reference to FIG. 1 wherein the interconnection between circuit blocks has been designated by arrows to indicate the direction of circuit action.

1. GENERAL DESCRIPTION

A station S1 is connected via a line L1 to an appearance R on link link frame 17. The input side of a call-waiting circuit 14 is connected via a line L2 to an appearance A on line link frame 17. Station S1, which is assumed to be a special service station in its inactive state, is connected into the switching network via line link frame 17 in the same fashion as other stations (not shown) as well known in the art and as set forth in detail in the cited Busch patent.

A call-waiting auxiliary line circuit 13 is connected to both the sleeve lead of the special service station S1 and to an appearance of station S1 in the number group circuit 12. When the special service station S1 goes off-hook, the marker 11 functions to connect an originating register 19 to the line link appearance R of the station and the customer receives dial tone. The station S1 then dials a number and the marker 11 again functions to complete the call by connecting the line link appearance R to either another appearance on the line link frame 17 for an intraoffice call via an intraoffice trunk (not shown) or to a station in another office via an outgoing trunk appearance such as appearance V of outgoing trunk 23 on trunk line frame 18. At this point the progression of the outgoing call has been strictly in accordance with the description in the cited Busch patent. Similarily, when an incoming call is received for the special service station S1 via the incoming trunks 21 or 22, the marker 11 functions to connect the associated appearance on the trunk link frame 18 to appearance R on the line link frame and again the call is completed in accordance with the teachings of the Busch patent. However, in addition, in the instant embodiment, when the incoming and outgoing calls are completed, a first relay in the call-waiting auxiliary line circuit 13 is operated by the ground placed on the sleeve lead of the special service station line L1. Operation of the first relay partially completes a path for the operation of a second relay whose function will be discussed below.

We shall assume that the first relay in the auxiliary line circuit 13 is operated and a call is in progress with special service station S1, and that an incoming call on trunk 22 is recognized by marker 11. The marker goes through the number group connector 16 to the number group circuit 12 to obtain the line link location of the called station which we shall further assume to be station S1. The appearance of the special service station S1 in the number group 12 is arranged, as will be more apparent hereinafter, to enable marker 11 to operate the second relay in auxiliary line circuit 13. The second relay energizes preference and control circuit 15 which selects an idle call-waiting circuit, such as call-waiting circuit 14; forwards the line link location of the selected call-waiting circuit 14; to marker 11; and erases the location information of station S1 registered in the marker. Marker 11 then connects the incoming call to the line link appearance A of the input line L2 of the selected call-waiting circuit 14. At the same time the preference and control circuit 15 actuates auxiliary link 201 to attach the output line L3 of the selected call-waiting circuit 14 to the line L1 of the special service station S1.

Approximately 10 seconds after call-waiting circuit 14 is attached to line L1, a tone is applied to the line. During the tone, a holding circuit prevents the party to whom the station S1 is connected from hearing the tone. If station S1 does not respond to the first tone by flashing his switchhook, a second tone is applied to line L1 10 seconds later. If the customer at the special service station S1 depresses his switchhook for a period of 0.2 to 1.5 seconds, the call-waiting circuit 14 will place the originally connected party on hold and connect the incoming call to station S1 via call-waiting circuit 14. In response to a second flash of the switchhook, the call-waiting circuit 14 reverses the procedure and reconnects the first connection to station S1 while holding the second connection.

If the special service station S1 hangs up while the incoming call is still trying to reach it, station S1 will ring. If the incoming party hangs up before reaching special service station S1, station S1 gets no further information about the incoming call. Upon termination of a call through the call-waiting circuit 14, the circuit becomes idle and available for use by another special service station having need of the call-waiting function.

2. DETAILED DESCRIPTION

2.01 Introduction

Figure 6:
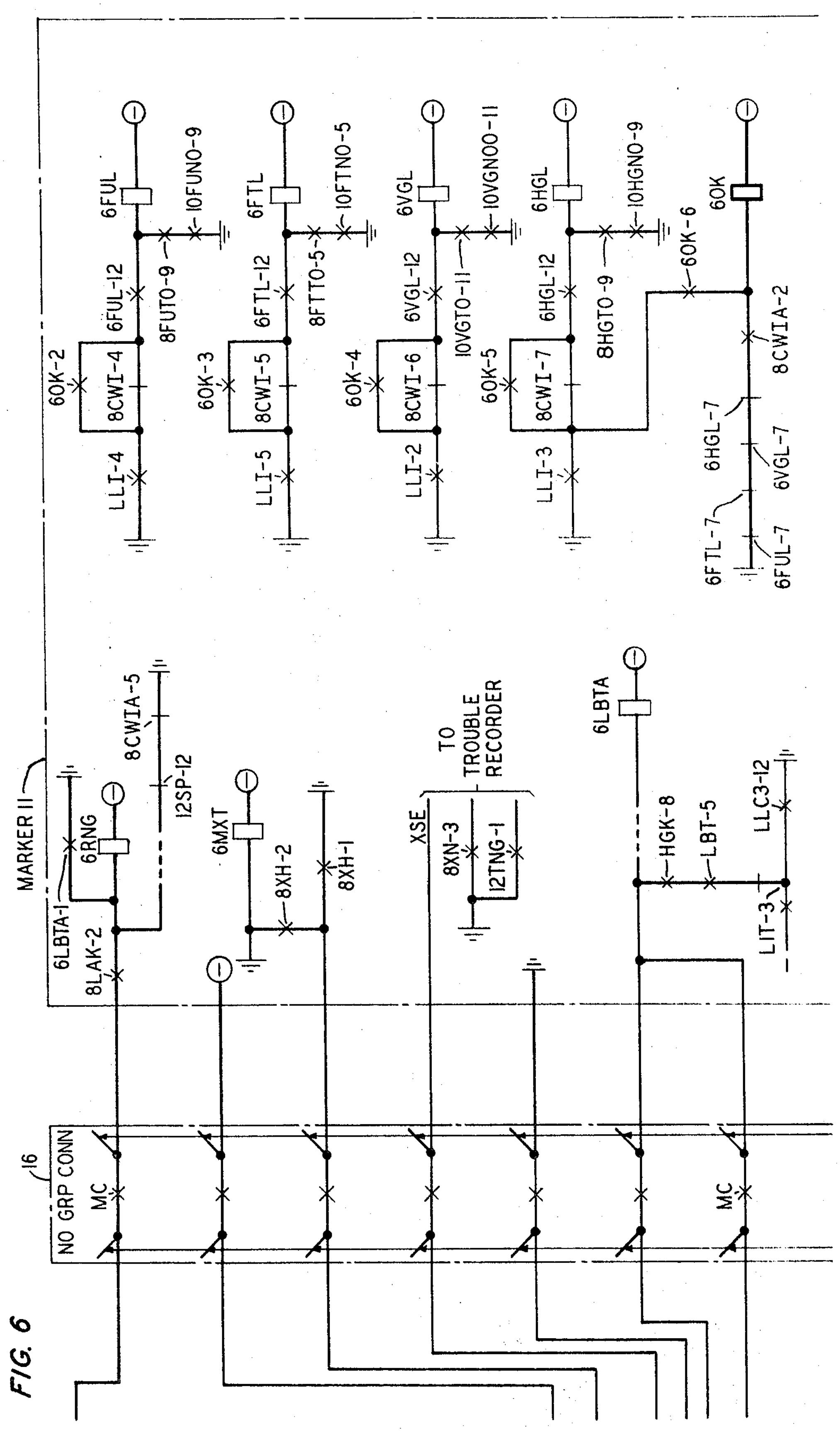
Figure 8:
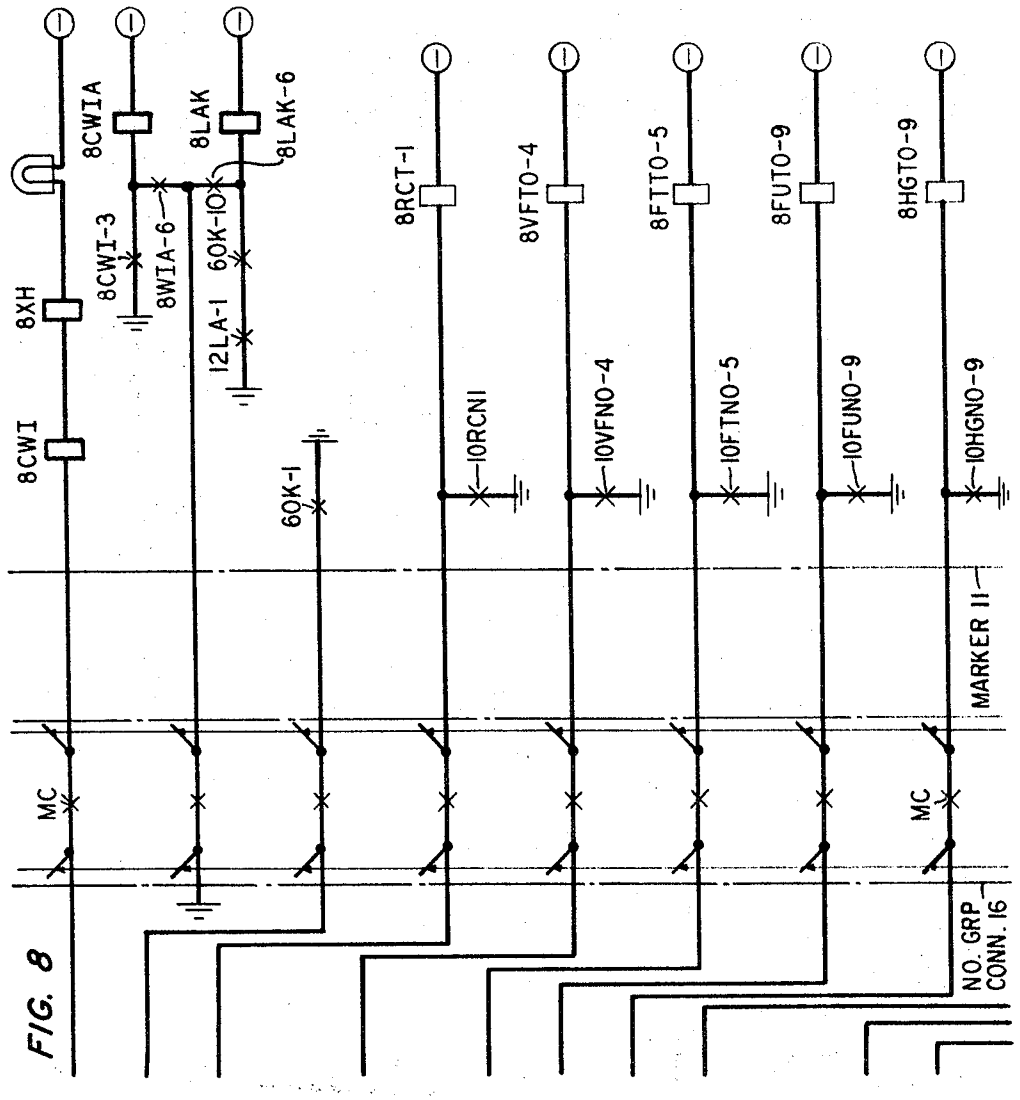
Figure 9:
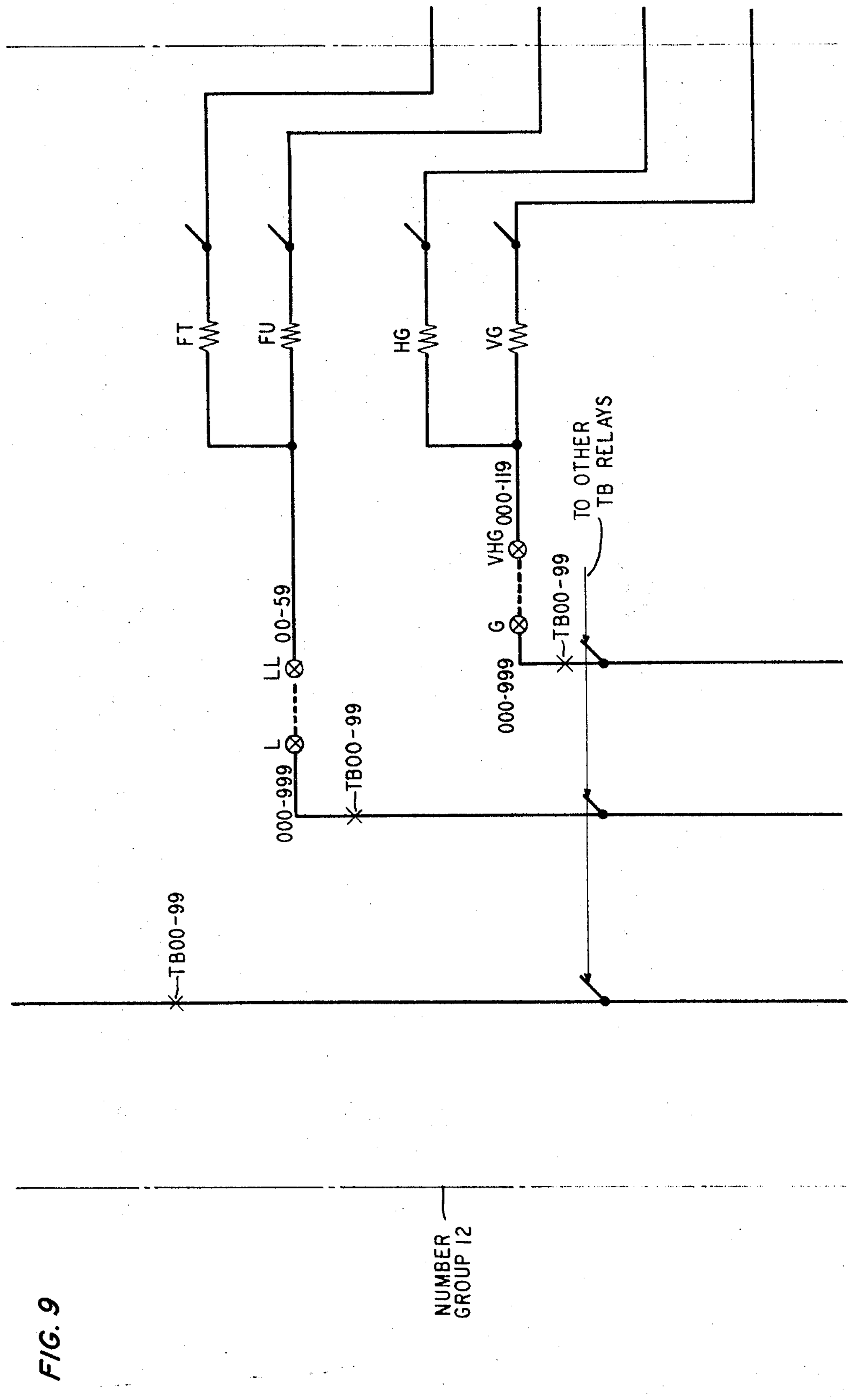
Figure 10:
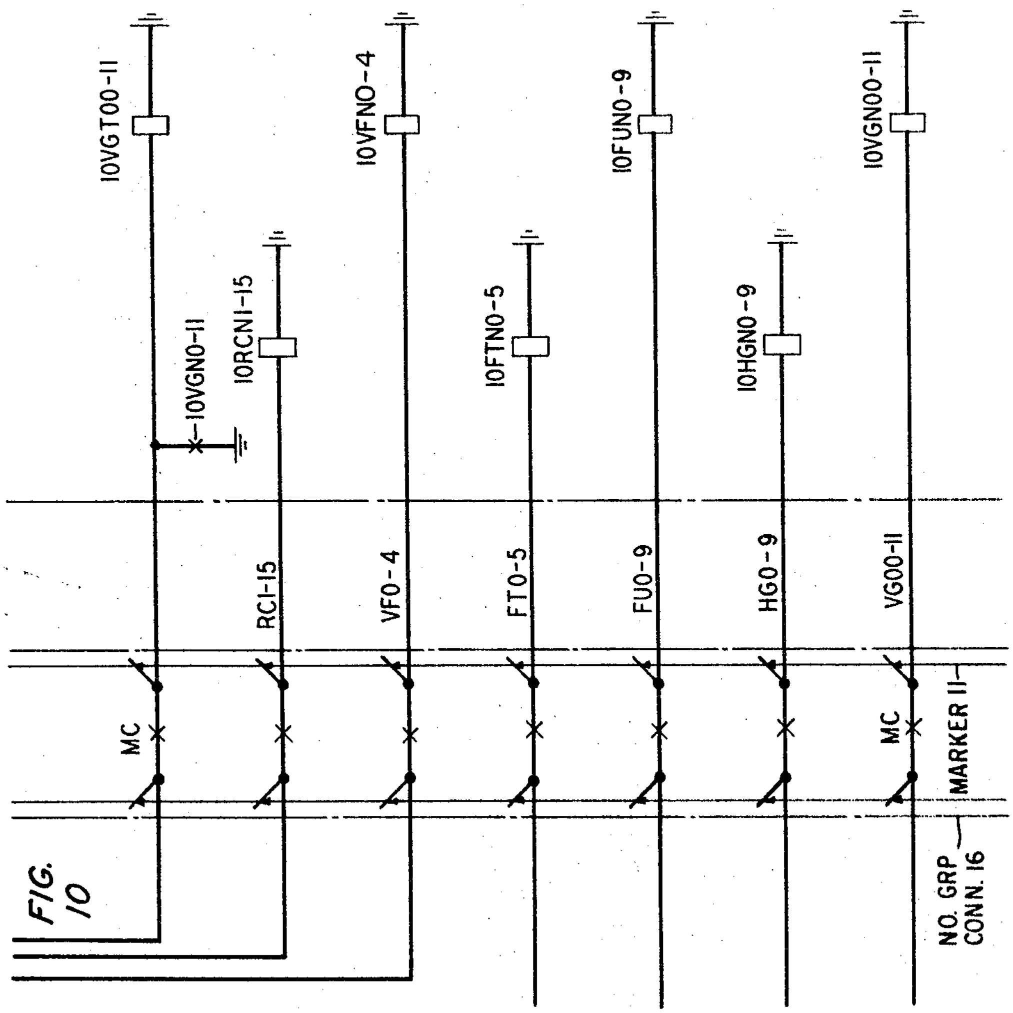
Figure 11:
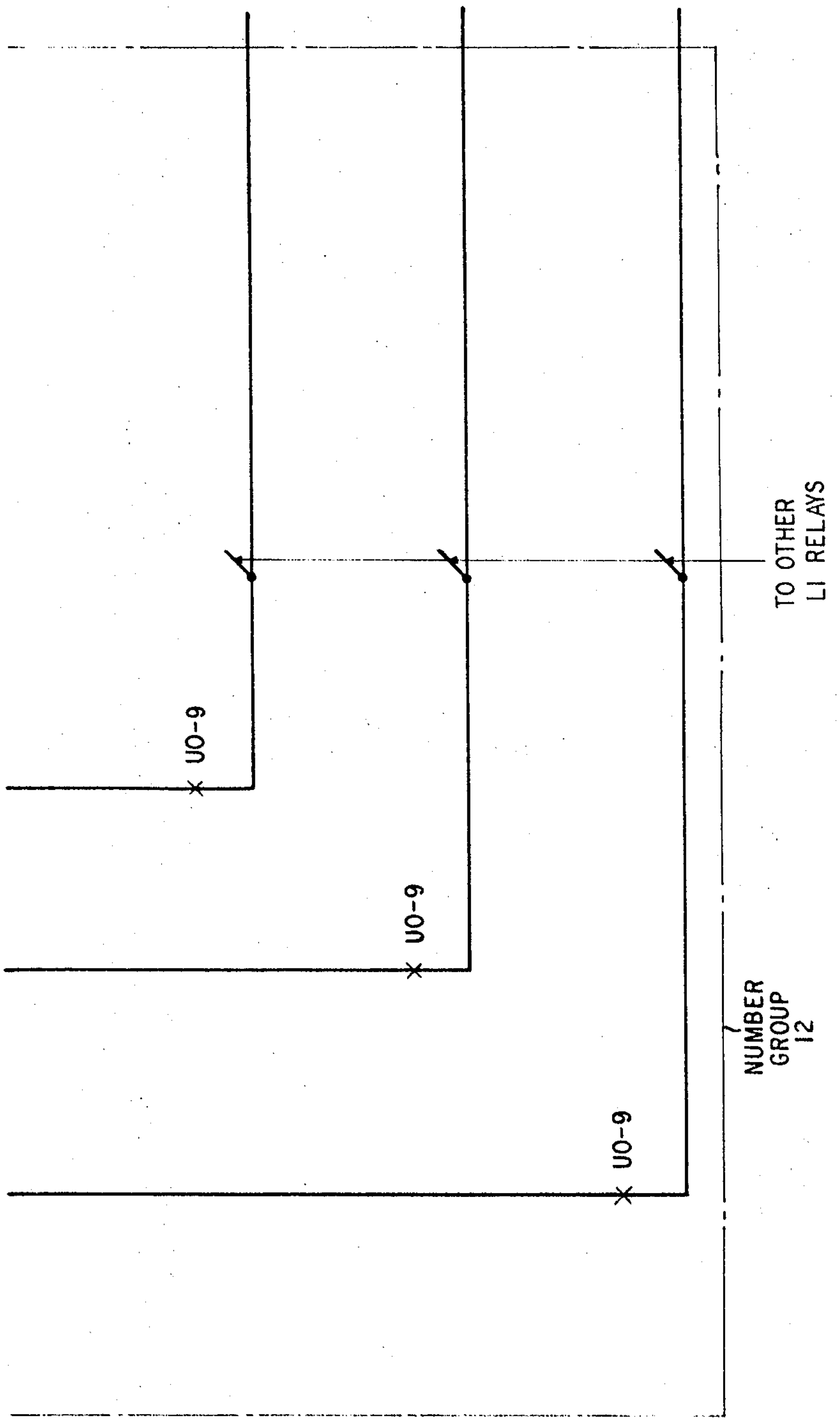
Figure 13:
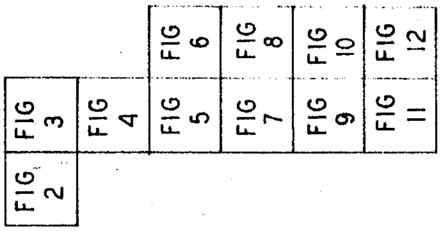
FIG. 13 shows the manner in which the various other figures should be arranged.
Figure 12:
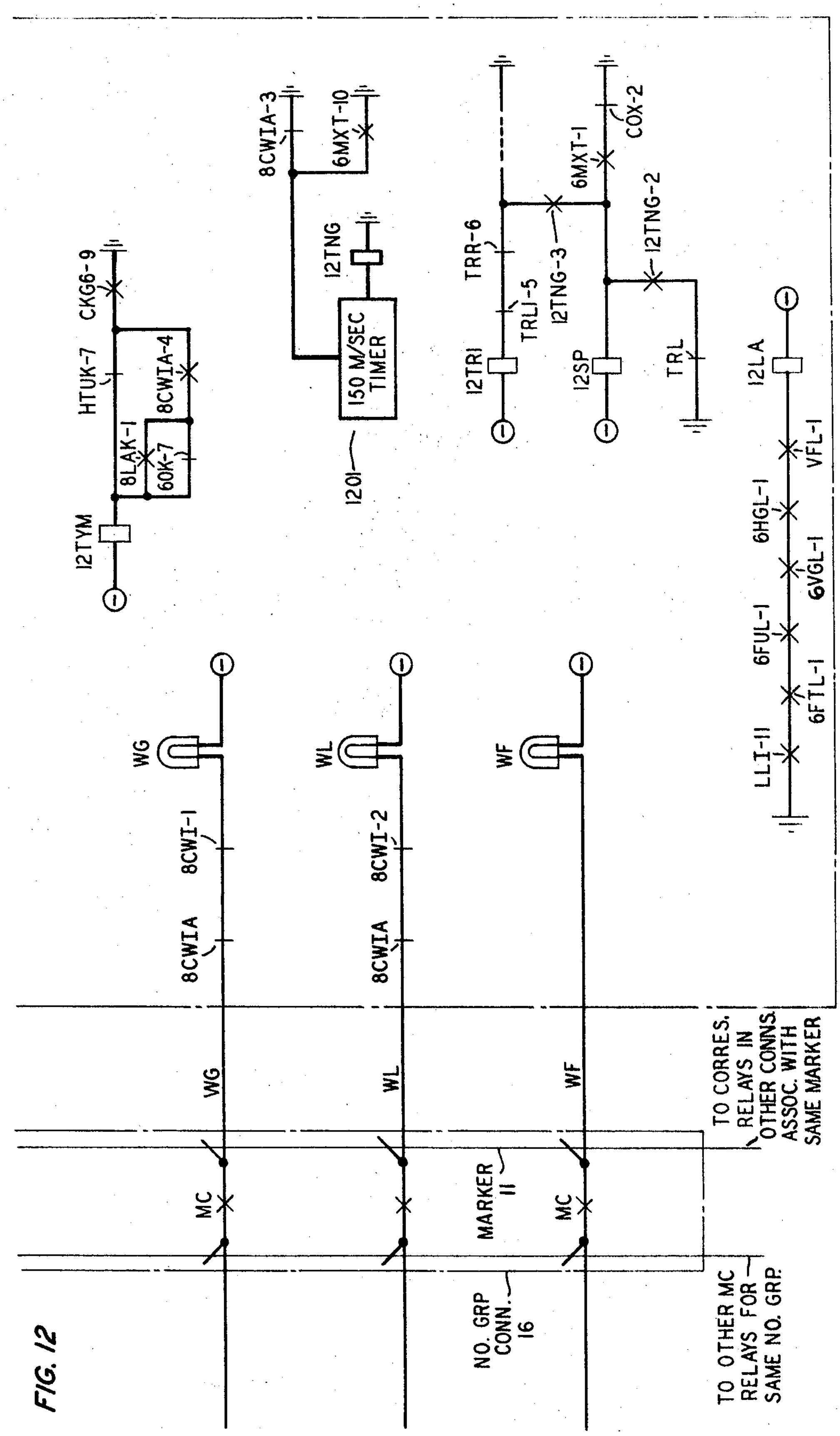

To facilitate the detailed description of the illustrative embodiment certain relays and a timing circuit shown on FIGS. 6, 8 and 12 and located in marker circuit 11 are outlined with heavy lines to distinguish them from other marker apparatus which is more fully shown and described in the aforecited Busch patent.

The call-waiting equipment described herein is preferably mounted in a bay set aside for such use. A call-waiting frame may typically contain one preference and control circuit for each number group. Each preference and control circuit is arranged to select from ten available call-waiting circuits. The call-waiting frame may also contain a standard six wire 200-point crossbar switch as an auxiliary line link, having special service line circuits cross-connected to the 20 verticals and the 10 available call-waiting circuits to the horizontals of the switch. If more than 20 special service customers are to have access to the 10 call-waiting circuits, other crossbar switches may be operated in tandem with the first switch, however, there should be a separate switch for each number group having access to the 10 call-waiting circuits. Herein, for simplicity of description, it will be assumed only one number group has access to the circuits.

In columns 84—86 and FIGS. 17 and 18 of the Busch patent it is explained how terminals designated F corresponding to a numerical line designation are cross-connected to translator terminals designated RF in order to operate the proper translation relays and give the correct line link location of the called station. In the instant arrangement in FIG. 7, the terminals designated F for special service stations are cross-connected to an added CW terminal which, in turn, is connected to the auxiliary line circuit associated with the special service station. The significance of this arrangement will be more fully described hereinafter.

2.02 Originating Connection from Station S1

Figure 2:
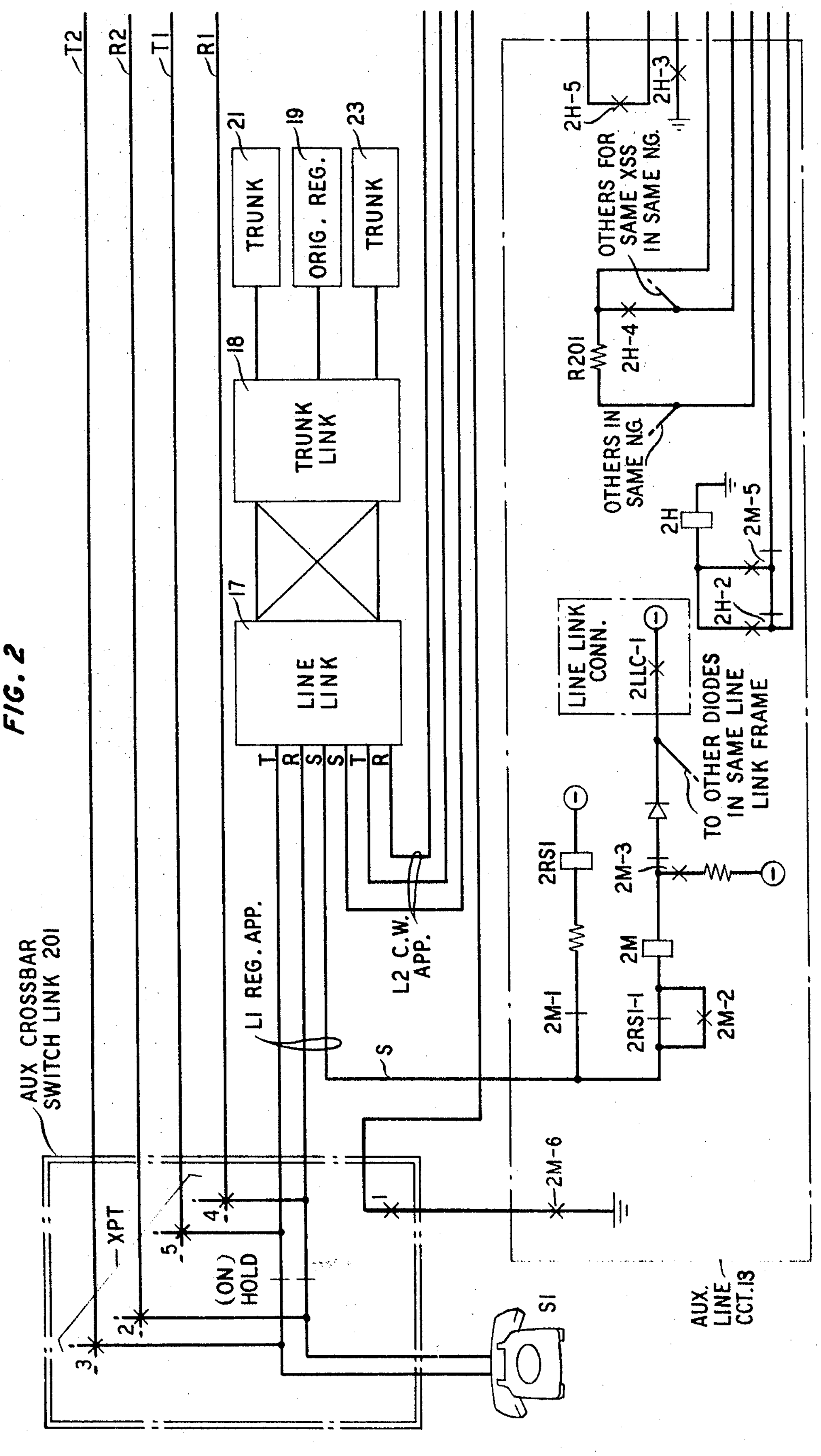
FIGS. 2 through 12 show in greater detail some of the components of the exemplary embodiment.
Figure 3:
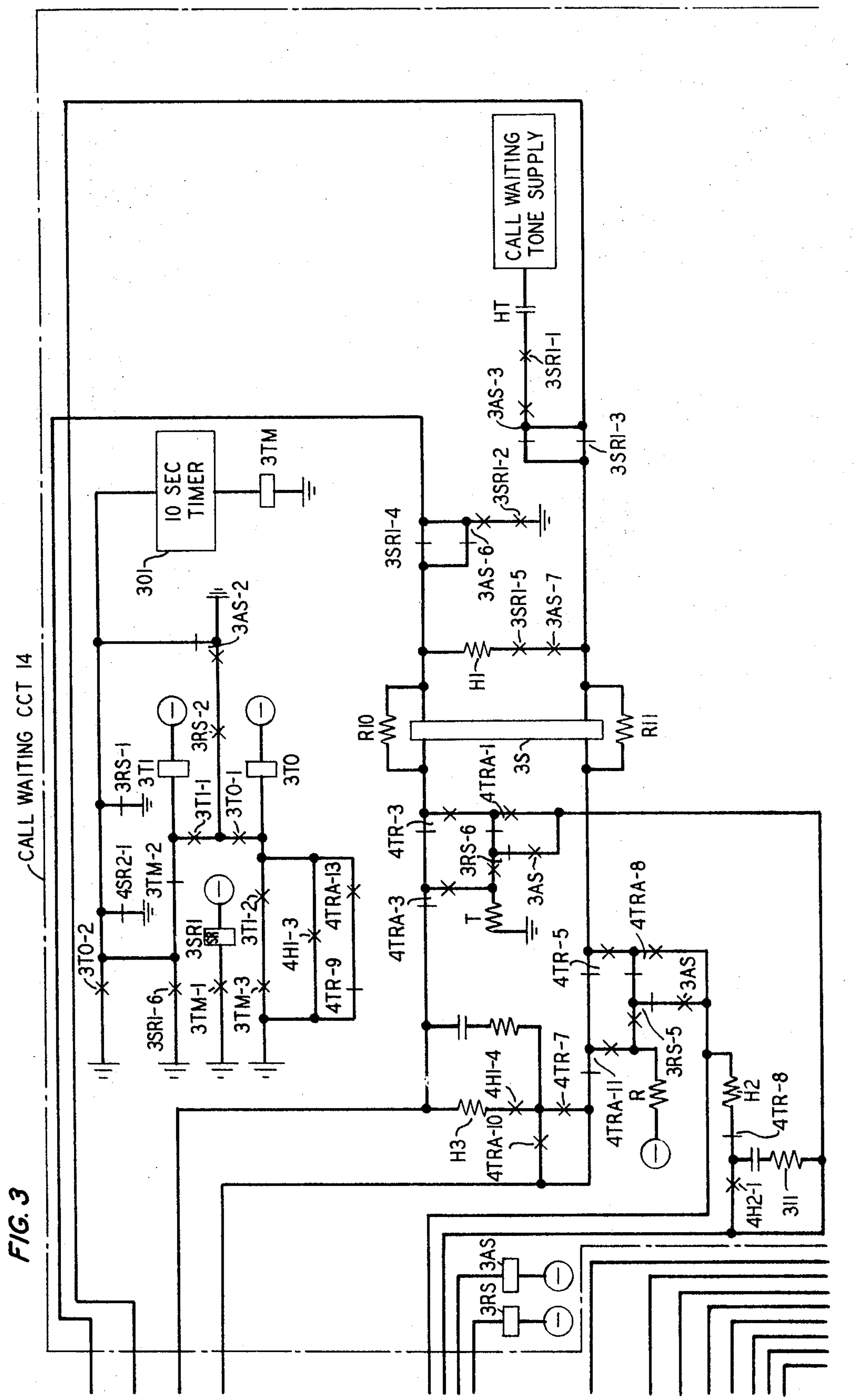
Figure 4:
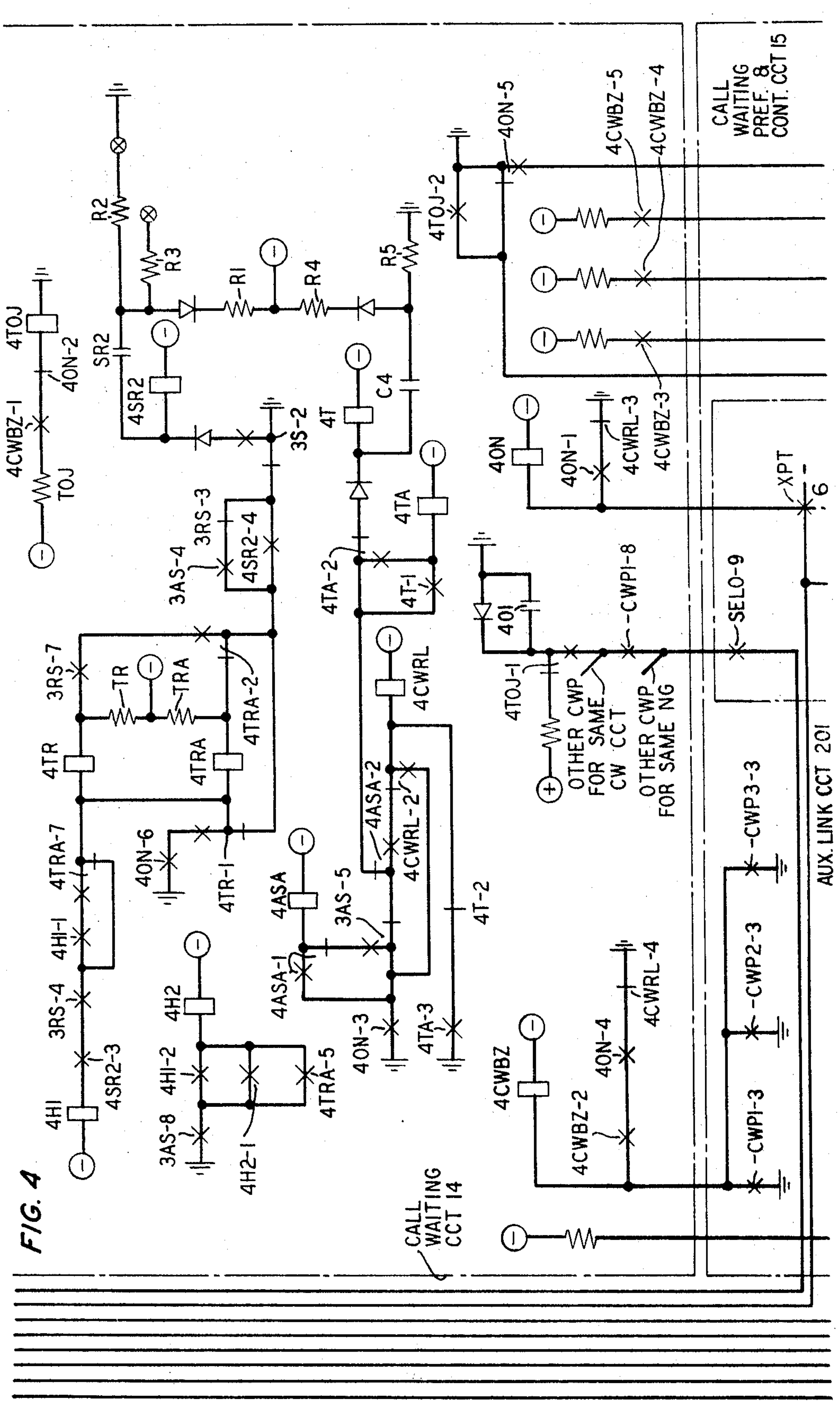

In the following, we shall assume that station S1 is changed from the on-hook to the enabled off-hook condition prior to dialing a call in the well-known manner. Referring now to FIG. 2, after station S1 goes off-hook the marker functions to connect the station to an originating register to furnish dial tone in the well-known manner and as is explained in detail beginning at Col. 6, line 39, of the Busch patent. As the marker operates, ground is placed on the sleeve lead of the station line circuit to operate the line holding magnet L-HM in the line link circuit (not shown) to hold the selected crossbar switch operated. Since the sleeve lead of the station line circuit is connected to the auxiliary line circuit 13, the 2RS1 relay operates at the same time as the L-HM. The customer now receives dial tone and dials a director number. Following receipt of the dialing information, the originating register enables the marker circuitry to complete the call through a callback linkage in the usual manner. In completing the callback linkage, the marker removes the ground on the sleeve lead to release the hold magnet L-HM and thus release the originating register; thus also releasing the 2RS1 relay. The marker then reoperates another select magnet and the same hold magnet L-HM to connect the customer's link link appearance to an outgoing trunk (or intraoffice trunk) and at the same time applies —48 volts to the winding of the 2M relay attached to each call-waiting customer's line through the 1 contacts of the line link connector 2LLC. As ground is reapplied to the sleeve lead on the callback connection, the 2M relay is operated rather than the 2RS1 relay because of the high resistance, for example 4270 ohms, in series with the high resistance winding, for example 9.1K ohms, of relay 2RS1. The high resistance also serves to make the 2RS1 winding lead appear as an open circuit when the marker makes the crossed line hold magnet test (see Col. 51, line 21, of Busch Pat.).

The purpose of the 2RS1 relay is to prevent the operation of the 2M relay during a dial tone connection by opening the break contacts 2RS1–1 to disconnect the 2M relay from the customer's sleeve lead. If this were not done, a customer receiving dial tone would have ground at one side of his 2M relay and if, at the same time, another customer on the same link line frame completed a call, —48 volts would be placed on all the M relays and the 2M relay of the customer receiving dial tone would be operated. Operation of the 2M relay signals that a station is ready to receive a second incoming call via a call-waiting circuit and for this reason should not be operated during the dialing process. As will be more apparent from that which is contained hereinafter, the call-waiting feature is disabled during dialing in this way to prevent possible interference with transmitted dial pulses.

Operation of the 2M relay prevents the subsequent operation of the 2RS1 relay by opening its path to ground through the 2M–1 contact. The winding of the operated 2M relay is locked to the grounded sleeve lead of the special service station S1 through the 2M–2 contact and to a locking —48 volt source and a series resistance through transfer contact 2M–3. The transfer contact 2M–3 releases the winding of the relay from the —48 volts momentarily applied through the line link connector.

The station S1 is now connected to an outgoing trunk and is engaged in conversation with another station. Since the 2M relay in the auxiliary line circuit associated with the station S1 is now operated, the apparatus is prepared to receive a second incoming call and actuate the circuitry necessary to perform the call-waiting function. However, before discussing circuit operation during a second incoming call, we will first examine the connection of a first incoming call to station S1 when it is in a idle condition.

2.03 Terminating Connection to Station S1

Each incoming connection is extended from the associated trunk link frame to an incoming register (not shown) which receives the directory number of the called station S1 from the calling office. The incoming register thereupon passes the directory number of the call-waiting customer's station S1 to the marker, which applies the number to the number group circuit 12 through the number group connector 16 in a manner well known in the art and more fully described in the earlier cited Busch patent. As was explained above in connection with the number group modification, the terminals L and G (FIG. 9) are cross-connected to terminals LL and VHG to pass line link and vertical and horizontal group information, respectively, to the marker. The number group connection operates relays 10FTNO—10FTN5, 10FUN0—10FUN9, 10HGN0—10HGN9 and 10VGN00—10VGN11 in various combinations to provide the marker with the line link location of the called station S1. When the called station is not a call-waiting customer, there is a cross-connection between terminals F and RF (FIG. 7) in the number group so that a translation operation by the marker will also succeed in operating the relays RCN1—RCN15 and VFNO—VFN5 to provide ringing combination and vertical file information to the marker. However, since station S1 is a call-waiting station, the terminal F of FIG. 7 associated with the station in the number group is not connected to the RF terminal but instead is cross-connected to a CW terminal. As the number translation occurs in the number group, the —48 volts on the F terminal is connected through released transfer contact 2 of the 2H relay and released transfer contact 5 of the 2M relay to the MF terminal in the preference and control circuit. Since the station S1 is idle, both the 2M and 2H relays are unoperated. The MF terminal is cross-connected to an RF terminal and the —48 volts thereon operates one of the relays 7SVF0—7SVF4. There is one such relay per number group associated with each preference and control circuit. Make contact 1 of the operated 7SVF—relay supplies ground to operate the 8RCT1 relay in the marker. Enabled transfer contact 4 of the operated 7SVF-relay supplies ground to operate the corresponding 8VFT0—8VFT4 relay. In a noncall waiting translation the relays 8RCT1 and 8VFT0—8VFT4 relays are operated directly by ground from make contacts of the 8RCN1—8RCN15 and 8VFN0—8VNF4 relays. The number translation is completed when the relays 8FTT0—8FTT5, 8FUTO—8FUT9, 8HGTO—8HGT9 and 10VGT0—10VGT11 are operated by closure of contacts of the FTN, FUN, HGN, and VGN relays.

Following translation, the marker functions to select a channel to the line link location of the called station S1 and places a ground on the sleeve lead thereof in the well-known manner as more fully described in the earlier cited Busch patent. The ground operates the line hold magnet L-HM (not shown) and the 2M relay in the auxiliary line circuit. The called station S1 rings and when answered the conversation proceeds normally with the 2M relay remaining operated to indicate the station is prepared to receive a second incoming call via the call-waiting circuitry.

2.04 Incoming Call to an Activated Station S1

Busy on the Regular Appearance

Figure 5:
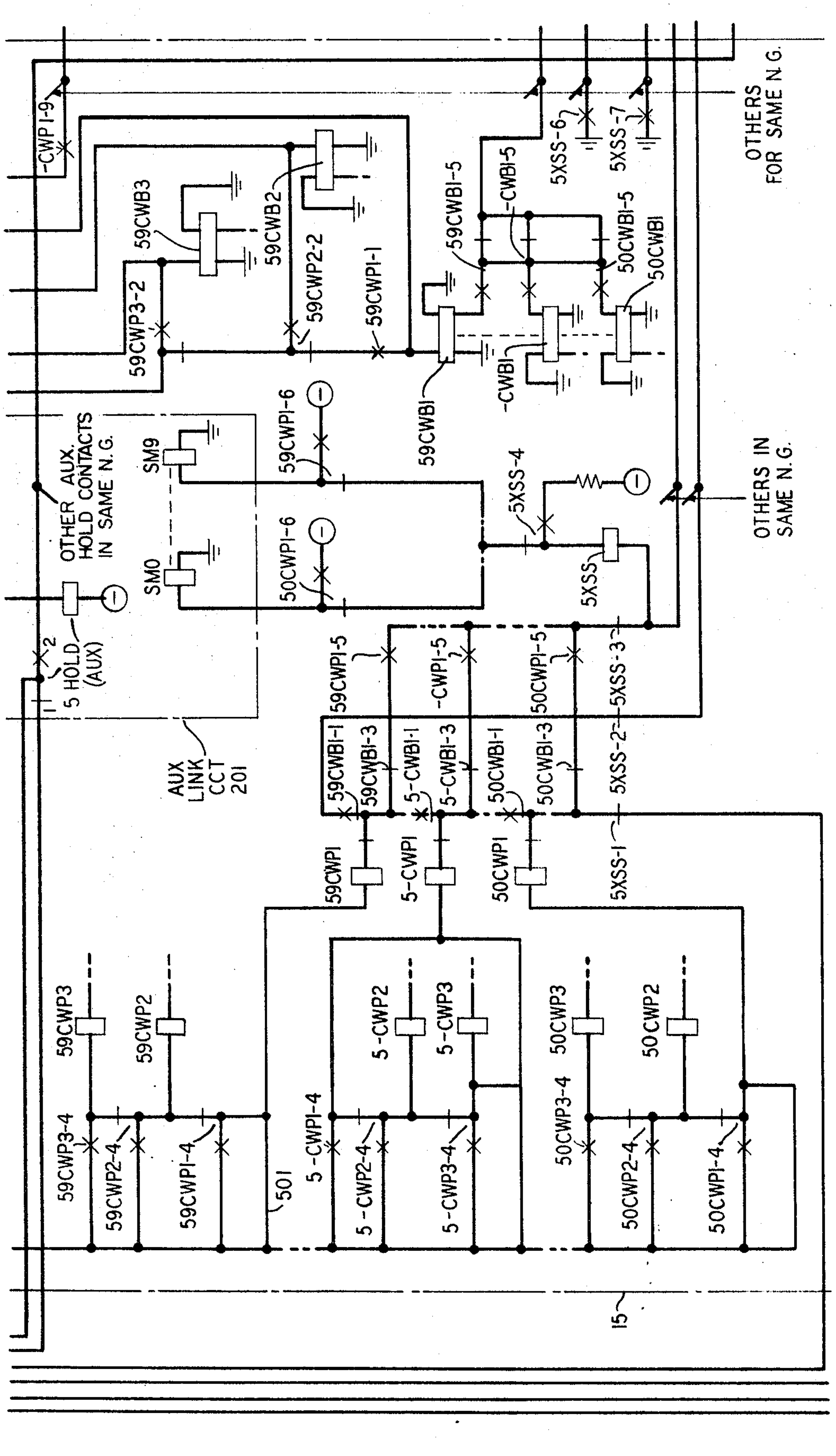

Assuming that the special service station S1 is busy, a second incoming call to the station is connected through an incoming register to the marker in the same manner as the initial call. The marker forwards the directory number to the number group for translation, and relays 10FTN0—10FTN5, 10FUNO—10FUN9, 10HGN0—10HGN9, 10VGN00—10VGN11 operate an actuate the 8FTT0—8FTT5, 8FUTO—8FUT9, 8HGTO—8HGT9, and 10 VGTO—10VGT11 relays just as they did when the appearance of the station S1 was not busy. The 6FUL, 6FTL, 6VGL, and 6HGL relays are operated through the 8FUTO—9—12 and 10FUNO—9—12, 8FFT0—5—12 and 8FTN0—5—3, 10VGTO—11—10 and 10VGN00—11—3, and 10HGTO—9—12 and 10HGNO—9—3 contacts, respectively, and the partial translation is locked into the relays through their own respective contacts 12 and contacts 4, 5, 2 and 3, respectively, of the previously operated LLI relay. Now, however, since the station is busy and the 2M relay in the auxiliary line circuit associated with the station is operated, the negative 48 volt signal on the F terminal of the number group circuit is prevented from operating the 7SVF0—7SVF4 relays by the open contacts 2M–5 in the auxiliary line circuit. Instead, the negative 48 volt signal is connected through the released transfer contact 2H–2 and enabled transfer contact 2M–5 to operate the 2H relay which thereupon locks itself operated through the enabled 2H–2 transfer contacts. Operation of the 2H relay closes a path from ground through the 2H–3 make contacts, the 5HOLD–1 transfer contacts, and the R201 resistor to operate the 8CWI relay. Relay 8XH operates if more than one relay 2H is operated. Operation of the 8CWI relay serves to erase the partial number translation which has already taken place by opening the WL and WG leads of FIG. 12 with 8CWI-1 and 8CWI-2 break contacts to remove the negative 48 volts from the windings of the 10FTN, 10FUN, 10HGN, and 10VGN relays. At the same time the 8CWI relay breaks contacts 4—7 open the operate paths of the 6FUL, 6FTL, 6VGL, and 6HGL relays which have served to lock in the translation of the relays 8FTT, 8FUT, 8HGT, and 10VGT. Operation of the 8CWI relay also serves to connect ground to the winding of the 8CWIA relay through enabled make contact 8CWI-3. Opening of the 8CWIA-3 break contact further serves to start the 150 millisecond timer 1201 in the marker circuit. As the locking relays 6FUL, 6FTL, 6VGL and 6HGL are released, they close break contacts 6FUL-7, 6FTL-7, 6VGL-7, and 6HGL-7 to operate the 60K relay through the make contact 8CWIA-2 which locks through enabled make contact 60K-6 by an obvious circuit. The operation of the 60K relay signals that the erasure of the number translation has been completed and starts the 12TYM timing relay in the marker circuit through enabled break contact 60K-7. The preference circuit shown in FIG. 5 is arranged to provide access to ten call-waiting circuits through three separate number groups. The preference chain is designed to prefer granting access to a given idle call-waiting circuit from one number group over another when two requests for a circuit are received simultaneously. In FIG. 5, the last digit in the relay designation refers to the number group with which the relay designation refers to the number group with which the relay is associated while the second number is the relay designation within that group. For example, relay 59CWP1 is the ninth relay in the preference chain of the first number group. The preference circuit is shown and discussed with major emphasis on the circuitry for the first number group, with the other groups only mentioned for clarification purposes.

Referring now to FIG. 2, at the same time that the operation of the 2H relay initiates the number translation erasure, the closure of contacts 2H-4 serves to actuate a call-waiting preference chain to select an available call-waiting circuit. If we assume that all 10 of the available call-waiting circuits are in use, all of the relays 50CWB1—59CWB1 will be operated to open the break contacts 1 and close make contacts 2 to close a path so that the ground extended from enabled make contact 2H-3 in FIG. 2 through enabled transfer contact 5HOLD-1 in FIG. 5, and enabled make contact 2H-4 in FIG. 2 will close a path to operate the 6LBTA relay. The 6RNG relay is operated through make contact 6LBTA-1 which results in the release of the number group and the connection of the incoming call to busy tone.

If, however, we assume that all but one of the call-waiting circuits are busy and that the station S1 is in the first number group, a ground connection through the 2H-4 contacts will operate the tenth CWP relay in the first number group preference chain, namely relay 59CWP1. Contacts 59CWP1-3 (denoted in FIG. 5 as -CWPL-3) close to operate the 4CWBZ relay in the selected call-waiting circuit 14, and contacts 4CWBZ-3 through 4CWBZ-5 return —48 volts to the relays of the CWB chain. Contact 59CWP1-1 is now closed so that the battery on the winding of relay 59CWB1 is shunted by the ground through break contacts 4ON-5, 59CWP3-2 and 59CWP2-2. Since neither the 59CWP2-2 nor 59CWP3-2 transfer contacts are enabled, the 59CWB2 and 59CWB3 relays operate from the —48 volts through contacts 4CWBZ-4 and 4CWBZ-3, respectively. Since relay 59CWB1 is not operated, relay 59CWP1 is held operated by ground from the marker through contacts 59CWP1-5, 59CWB1-3 and 59CWB1-1.

Operation of the 59CWB relays associated with the number groups 2 and 3 prevents the corresponding 9CWP relays in the other preference chains from being operated by a subsequent request for a call-waiting circuit. Battery to operate the 59CWP1 relay comes from the call-waiting circuit through a similar chain of contacts. The "strap" 501 around contacts 59CWP1-4 provides that a request by number group one will receive priority over a simultaneous request by groups two and three. When contacts 59CWP1-4 have opened, neither relay 59CWP2 nor 59CWP3 may be operated. The contact chains shown for the other CWP relays operate in the same manner.

Transfer contact 59CWP1-6 closes a path to operate the select magnet 9 on the auxiliary link corresponding to the selected call-waiting circuit. After the hold magnet is operated, as discussed below, the 4ON relay will be operated and the 4TOJ released so that relay 59CWB1 will now be operated. Operation of 59CWB-1 contacts releases the 59CWP1 relay and, through contacts 59CWP1-6 releases select magnet 9.

The chain of transfer contacts 5 of the 5-CWB1 relays is provided so that if at least one of the relays is operated all of the relays which are operated are held operated during the selection of a call-waiting circuit. This prevents a call-waiting circuit from being released while a bid is being made for an idle circuit.

The 5XSS relay is provided for a cross-test of the select magnet leads. If a fault occurs, —48 volts is placed on the winding of the 5XSS which locks through contacts 5XSS-4. Ground through contacts 5XSS-6 and 5XSS-7 is returned from the preference and control circuit of FIG. 5 to the marker to operate the master cross-test relay 6MXT and to place a signal to the trouble recorder, respectively. As pointed out above, operation of the 59CWP1-3 contact enables relay 4CWBZ in the selected call-waiting circuit which locks and, through contacts 4CWBZ-1 energizes the 4TOJ relay.

Figure 7:
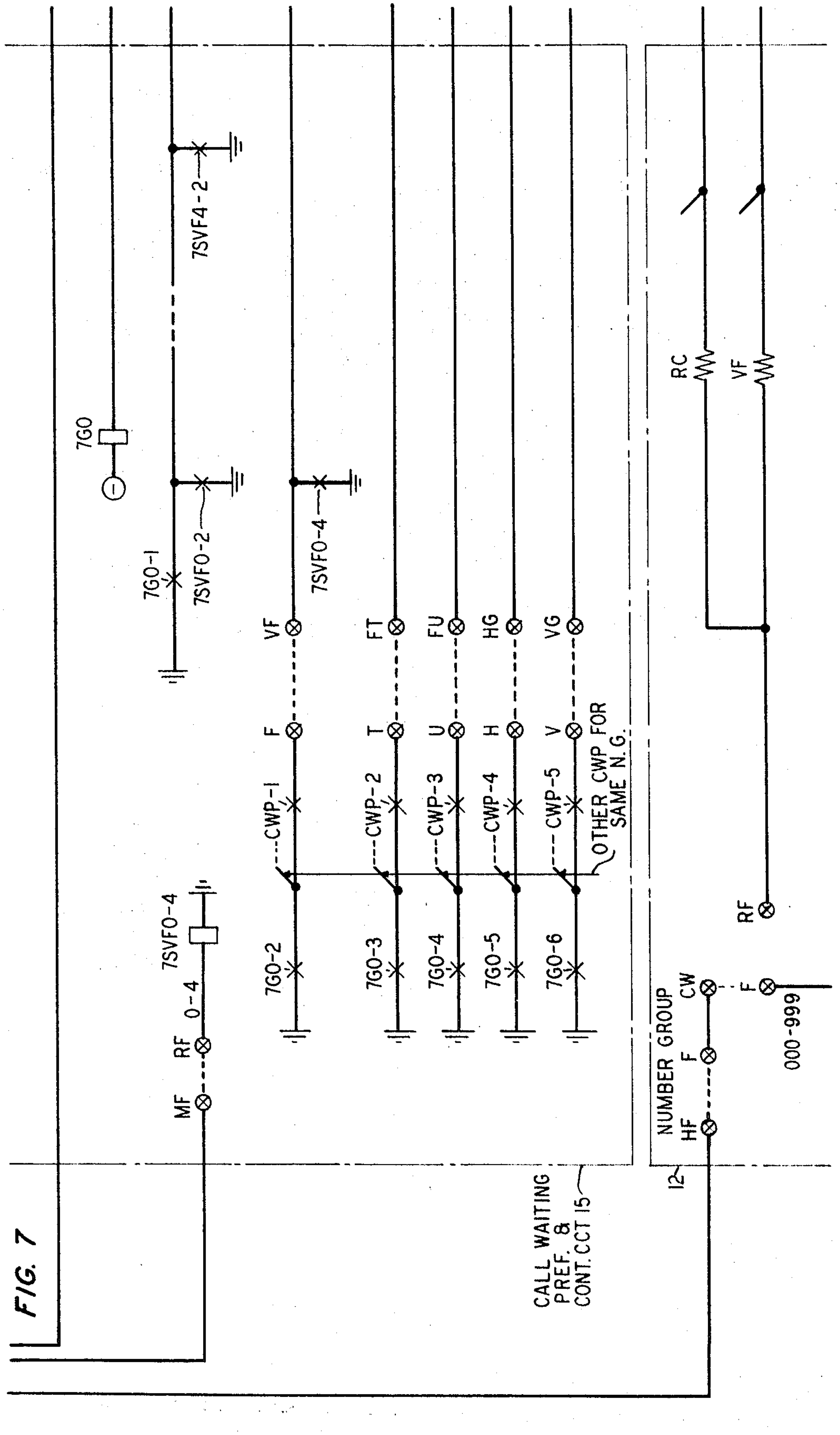

Referring again to FIG. 6, the 60K relay closes contacts 60K-1 to complete the obvious operate path of the 7GO relay which thereupon extends the line link location of the selected call-waiting circuit from FIG. 7 to the marker through contacts 7G0-1 through 7G0-6 and 59CWP1-1 through 59CWP1-5. A combination of relays 8RCT1, 8VFT0—8VFT4, 8FTT0—8FTT5, 8FUT0—8FUT9, 8HGT0—8GHT9, and 10VGT0—10VGT11 operate and are locked by relays 6FUL, 6FTL, 6VGL and 6HGL through contacts 60K-2 through 60K-5 as earlier described. The marker now functions in the normal manner to cause the line link hold magnet L-HM to connect the incoming call to the appearance of the selected call-waiting circuit. The closure to the call-waiting circuit appearance also places ground on the sleeve lead to operate relay 3AS.

Locking of the translation of the call-waiting circuit line location information operates the 12LA relay through contacts LLI-11, 6FTL-1, 6FUL-1, 6VGL-1, 6HGL-1, and VFL-1. Make contacts 12LA-1 and 60K-2 close an operate path for relay 8LAK which interrupts the 12TYM timer through contacts 8LAK-1. Make contacts 8LAK-2, 40N-5, and 5CWP1-9 operate the 6RNG relay and the number group circuit is released when the NGC and HTUK relays are released, as set forth in the cited Busch patent.

The 59CWP1-6 contacts operate a select magnet on the auxiliary crossbar switch corresponding to the selected first available call-waiting circuit and a path is completed from capacitor 401, which has been charged between ground and the voltage source, through the 4T0J-1 transfer contacts, the 5CWP1-8 contacts, the 5SEL-1 contacts, and the 2H-5 contacts to operate the 5HOLD magnet on the auxiliary crossbar switch corresponding to the particular special service station S1 being called. With both the select and hold magnets of the auxiliary link operated, cross-point contacts 2 and 3, and 4 and 5 of auxiliary link 201 close two separate transmission paths from the T and R conductors of the line circuit of station S1 to T1, R1 and T2, R2 conductors of call-waiting circuit 14. Closure of cross-point contact 6 (FIG. 5) provides a path to operate the 4ON relay and cross-point contact 1 connects the grounded sleeve lead from auxiliary line circuit 13 to the winding of relay 3RS in call-waiting circuit 14. The 4ON relay locks operated through enabled 4ON-1 and 4CWRL-3 contacts, which also serves to lock the 5HOLD magnet in the operate condition so that when relay 2H is released, the auxiliary link cross-point connection remains enabled. Operation of the 4ON relay opens the holding circuit of the 4TOJ relay through contacts 4ON–2 and locks the 4CWBZ relay operated through enabled make contacts 4CWBZ–2, 40N–4 and released break contact 4CWRL–4. Release of the 4T0J–2 contact removes ground from the 59CWB1 relay in the preference and control circuit thereby releasing the 59CWP1 relay and the associated select magnet.

Referring to FIG. 5, actuation of the 5HOLD magnet operated the 40N relay which completes an operate path to ground for the 4T relay through contacts 4ON –3, 3AS–5, 4ASA–2 and 4TA–2. This operating ground also enables current to flow momentarily through the resistor R4 to charge the capacitor C4 so that when relay 4TA is subsequently operated by closure of make contact 4T–1 thus removing the ground from relay 4T via transfer contact 4TA–2, relay 4T will delay in releasing. Relay 4TA locks through transfer contacts 4TA2–2 so that 4TA is then independent of the release of relay contacts 4T–1. The relay 4T is used as a timer to release all circuitry if, for any reason, the marker is unable to connect the incoming call to the line link appearance of the call-waiting circuit within a predetermined time interval and thereby actuate the 3AS relay. If the 3AS relay is not operated to release the 4TA–2 contacts prior to timeout of the above-described RC circuit, release of break contact 4T–2 completes a path through make contacts 4TA–3 to operate the 4CWRL relay which locks to ground through transfer contacts 4CWRL–2. Actuation of the 4CWRL relay releases the busy relay 4CWBZ in the call-waiting circuit through enabled break contact 4CWBZ in the call-waiting circuit through enabled break contact 4CWRL–4. Release of the 4CWBZ in the call-waiting circuit also releases the corresponding 5–CWB— relay in the preference and control circuit.

If, however, the 3AS relay is operated as earlier described upon the connection of the incoming call to the call-waiting circuit before the 4T relay times out, the opening of contacts 3AS–5 releases the 4TA relay and removes ground from the 4TA–3 contacts thereby preventing the operation of the 4CWRL upon release of make contact 4TA–3. The 3AS relay also operates the 4ASA relay via contacts 4ON–3, 3AS–5, and 4ASA–1. Transfer contacts 4ASA–1 lock the 4ASA relay operated while contacts 4ASA–2 open the operate paths of the 4T and 4TA relays.

Connection of the T1, R1, and T2, R2 leads out of the call-waiting circuit through the respective cross-point connections 5, 4, 3 and 2, to the station line circuit causes line current to flow and actuates the 3S relay which, in turn, closes transfer contacts 3S–2 to operate relay 4SR2. The RC circuit formed by the capacitor SR2 and the resistor R2 is timed to release the 4SR2 relay in 1.5 to 2 seconds after the 3S relay releases and the transfer SS–2 contact opens. The output of 10 second timer 301 is connected to one side of the winding of the relay is arranged to begin timing when the ground connection is removed from its input lead. Since operation of the 3RS–1 break contact and 3AS–2 transfer removes this ground connection, operation of the 4SR2–1 contact removes the second connection to ground thus enabling the timer.

When the 10 second timer has timed-out, it applies –48 volts to operate the 3TM relay, which, in turn, operates the 3SR1 relay through the 3TM–1 contacts. Closure of the 3SR1–1 contact applies an audible call-waiting tone to one side of the line circuit of station S1 through the HT capacitor and the 3AS–3 contact. The closure of the 3SR1–2 contact grounds the other side of the customer's line through contacts 3AS–6 while the operation of break contacts 3SR1–3 and 3SR1–4 isolates the tone from the remainder of the call-waiting circuitry so that the tone is not extended to any station except station S1. While the tone is being applied to the line, the 3S relay is held operated through resistor H1 and contacts 3SR1–5 and 3AS–7. The operation of relay 3SR1 places ground back on the 10 second timer through make contact 3SR1–6 resulting in the release of relay 3TM. With the release of 3TM, the operate path of slow release relay 3SR1 is opened and 3SR1 starts to release. The release of relay 3TM operates relay 3T1 through break contact 3TM–2 and make contact 3SR1–6 and relay 3T1 locks to ground through the enabled make contacts 3T1–1 and 3RS–2, and enabled transfer contacts 3AS–2.

If the customer S1 does not answer the waiting call by flashing his switchhook upon receipt of the first tone, the timer reoperates relay 3TM after a 10 second interval. This second operation of relay 3TM closes make contacts 3TM–3 and completes a path through the closed make contacts 3T1–2 to operate the 3TO relay which locks operated through the 3TO–1 make contact and the 3RS make contact and the 3AS–2 transfer contacts. The closure of contact 3TO–2 connects ground to the input of the 10 second timer to insure that it will not begin another cycle. Closure of the 3TM–1 contacts again operates the 3SR1 relay to place the call-waiting tone on the customer's line. If at this point the customer at station S1 chooses to ignore the call-waiting tone, he receives no further information regarding the call until he hangs up and station S1 rings, as explained hereinafter. However, if the incoming caller hangs up before the station S1 depresses the switchhook, no further contact may be had between the parties.

If however, the customer at station S1 chooses to depress his switchhook, relay 3S releases due to the termination of the line current and forms a path from ground through transfer contacts 3S–2, make contact 4SR2–4, and transfer contact 4TR–1 to operate the 4TR relay through resistance TR. The 4TR relay locks to ground through make contacts 4ON–5 and transfer contact 4TR–1. Relay 4TRA is not operated by this same ground path because the winding of 4TRA is shunted by transfer contacts 4TR–1 and 4TRA–2. However, the same ground path does operate relay 4H1 through transfer contacts 4TRA–7, and make contacts 3RS–4, and 4SR2–3. Relay 4H2 is operated through make contacts 4H1–2 and 3AS–8 and locks operated through make contacts 4H2–1. The closure of make contacts 4H1–3 serves to operate the 3TO relay and disable the 10 second timer in the situation where the station S1 has responded to the first call-waiting tone and relay 3TO was therefore not operated as described above.

Release of the 3S relay also releases transfer contacts 3S–2 so that if the subscriber does not place the station off-hook again within form 1.5 to 2 seconds, the 4SR2 relay will be released. Release of the 4SR2 relay operates the 4TRA relay by removing the shunting ground over make contacts 4SR2–4 and transfer contacts 4TRA–2. Contacts 4TRA–1 and 4TRA–8 extend the ringing current to the appearance of station S1 through relay contacts 4TR–3 and 4TR–5 and through cross-points 4 and 5 in FIG. 2 to station S1. The other appearance of the station circuit is isolated from the first appearance by contacts 4TR–3 and 4TR–5. During the period between the operation of relay 4TR and relay 4TRA, battery current is supplied to the line through make contacts 3RS–5, 4TRA–8, 4TR–5 and 3RS–6, 4TRA–1, 4TR–3. The release of the 4SR2 relay also serves to release the 4H1 relay through opening of the 4 opening of the 4SR2–3 contacts and the 4H1–1 contacts release the holding circuit across the T and R conductors and therefore the S relay in the outgoing trunk circuit shown in the Busch patent which, after from 190—425 milliseconds, releases the supervisory relay in the outgoing trunk circuit. The release of the trunk supervisory relay releases the 2M and 3RS relays in the auxiliary line and call-waiting circuits by removing ground from the sleeve lead and at the same time releases the HOLD magnet of the line link switch of the regular appearance of the station S1. The release of the 3RS relay also serves to open the operate paths of the 3TO and 3T1 relays so that the station S1 is now ready to receive a new incoming call-waiting call on the regular appearance of its station line circuit.

When the station S1 now goes off-hook in response to the ringing signal, ringing is tripped and relay 3S is operated which again operates relay 4SR2 and the conversation now proceeds between the station S1 and the second incoming call on the auxiliary link circuit.

If, however, the station S1 does go off-hook again in less than 1.5 seconds in response to the call-waiting tone, the 3S relay is immediately reoperated to operate the 4TRA relay in the same manner and with the same results as were described above. The conversation now proceeds between the station S1 and the second incoming call on the auxiliary appearance, with the first call on the regular appearance being held.

2.05 Incoming Call to an Actuated Station S1

Busy on the Auxiliary Appearance

Now we shall assume that station S1 is engaged in conversation on the auxiliary appearance and receives an additional incoming call on the regular appearance. Ground on the sleeve lead of the line circuit of station S1 operates the 2M relay in the auxiliary line circuit and the HOLD magnet of the regular line link appearance. The 2M relay by closing contacts 2M–6 applies ground to operate the 3RS relay in the call-waiting circuit. Operation of the 3RS relay opens contact 3RS–1, removing ground from the 10 second timer 301 so that after timeout relay 3TM operates. Contact 3TM–1 closes ground to the winding of the 3SR1 relay which places the call-waiting tone on the station S1 through contacts 3SR1–1 and 3SR1–2 as earlier described. Release of the 3TM relay opens contacts 3TM–1 and starts the release of 3SR1 relay to remove the call-waiting tone from the customer's line circuit in a predetermined interval as earlier set forth.

If station S1 does not answer after the first call-waiting tone, relay 3TM is again operated by the 10 second timer 301 to reoperate the 3SR1 relay and again apply, and subsequently remove, a second tone to the customer's line circuit. The second operation of relay 3TM closes contacts 3TM–3 through contacts 3T1–2 to operate the 3TO relay and prevent the reactuation of the timer by placing a ground on the input thereof through contacts 3T0–2. When the station S1 goes on-hook, either in response to the first or second call-waiting tones or at the end of its conversation through the auxiliary appearance, line relay 3S releases. Release of the 3S relay closes ground through contacts 3S–2, 4TRA–2 and 3RS–7 thus shunting the winding of the 4TR relay releasing it. When the 4TR releases, 4TRA remains operated over the ground through contacts 3S–2, 4SR2–4, and 4TR–1. If the station S1 goes off-hook again in less than 1.5 seconds, the line relay 3S is reoperated to release relay 4TRA through break contact 3S–2 and thus trip the ringing on the regular appearance. The conversation between station S1 and the incoming call on the regular appearance proceeds through released transfer contacts 4TR–3, 4TRA–3 and 4TR–5, 4TRA–11. The call on the auxiliary appearance is held through resistor H2, and contacts 4TR–8, and 3H2–2.

If the station S1 is not in an off-hook state within 1.5—2 seconds following release of the 3S relay, the 4SR2 relay releases, which opens contacts 4SR2–4 thus releasing the 4TRA relay. Ringing current is applied to the line circuit of the regular appearance of S1 through contacts 4TR–3, 4TRA–3 and 4TR–5, 4TRA–11. When the station S1 returns to an off-hook state in response to the ringing signal, the 3S relay reoperates, which again operates relay 4SR2 through the 3S–2 contact and the conversation thereupon may proceed via the regular appearance. The auxiliary connection is held until ground is removed from the sleeve lead thereof to release the 3AS relay and thereby release the call-waiting circuit for subsequent use.

2.06 Conversation on Auxiliary Appearance of

Station S1 with Regular Appearance Held

Assume now that station S1 is engaged in conversation through the auxiliary appearance with the regular appearance being held through the 4H1–4 contacts. When station S1 goes on-hook, relay 3S releases and thus releases relay 4TR. If station S1 does not now return to an off-hook condition within 1.5—2 seconds, the 4SR2 relay releases, which releases the 4H1 relay through the 4SR2–3 contacts and also releases the 4TRA relay. Release of the 4H1–contacts opens the hold path for the supervisory relay in the outgoing trunk circuit (not shown) and from 190—425 milliseconds later the supervisory relay in the trunk also releases as well known in the art and more fully described in the Busch patent. Ground is thus removed from the sleeve lead, releasing the HOLD magnet in the regular line link appearance, the 2M relay in the auxiliary line circuit, and the 3RS relay in the call-waiting circuit. Release of the 3RS relay operates the 4TR relay through contacts 3S–2, 3RS–3, 3AS–4 and 4TR–1. Within from 13 to 32 seconds, in the well-known manner the incoming trunk circuit releases its ground on the sleeve lead of the auxiliary appearance which opens the holding paths for the HOLD magnet of the call-waiting circuit line link appearance and the 3AS relay in the call-waiting circuit. Release of the 3AS relay closes the 3AS–5 contacts to operate the 4CWRL relay. The 40N relay is then released through the 4CWRL–3 contacts. The HOLD magnet 5HOLD(AUX) for the auxiliary link is released, and the opening of the 40N–4 make contacts and the enabling of the 4CWRL–4 break contacts releases the 4CWBZ relay in the call-waiting circuit which, in turn, releases the 59CWB—in the preference and control circuit. The call-waiting circuit is now ready for subsequent use.

If, however, the station S1 does go off-hook in less than 1.5 seconds, line relay 3S reoperates, which releases the 4H1 and 4TRA relays. The conversation now proceeds between station S1 and the incoming call on the regular appearance with the party on the auxiliary appearance being held by contacts 4H2–1 and 4TR–8. Station S1 may continue to be connected alternately to one call and hold the other merely by flashing the switchhook.

Assuming station S1 again goes on-hook while connected to the regular appearance, line relay 3S releases and reoperates the 4H1 and 4TR relays. If the station S1 now does not go off-hook within the 1.5—2 second interval, the 4SR2 relay times out and releases, which releases the 4H1 relay and thereby the supervisory relay in the outgoing trunk circuit as well known in the art. Within a predetermined interval the outgoing trunk releases the HOLD magnet for the regular line link appearance, the 2M relay in the auxiliary line circuit, and the 3RS relay in the call-waiting circuit. Looking now at the auxiliary appearance, release of the 4SR2 relay also operates the 4TRA relay, which starts the disconnect timing circuit in the incoming trunk (not shown) and ground is removed from the sleeve lead of the auxiliary appearance in a predetermined time interval such as 13—32 seconds. Removal of ground releases the HOLD magnet for the line link 17 line appearance of the call-waiting circuit, and also releases the 3AS relay in the call-waiting circuit. Release of the 3AS relay closes ground through the 3AS–5 contact to operate the 4CWRL relay. Opening the 4CWRL–3 contact releases the 40N relay and the 5 HOLD (AUX) magnet for the call-waiting link. Release of the 4CWRL–4 and the 40N–4 contacts releases the 4CWBZ in the call-waiting circuit and release of the 5HOLD–1 contact releases the 59CWB- relay in the preference and control circuit. Both the regular and auxiliary line appearances are now idle and the call-waiting circuitry is free for future use.

2.07 Incoming Call while Both Regular and Auxiliary Appearance of Station S1 Are Busy If a terminating call is received when the station S1 is attached to a regular line link appearance, and therefore busy, and a call-waiting circuit is attached to the auxiliary appearance of station S1, so that it is also busy, an incoming call will operate the 2H relay in the auxiliary line circuit. Since the contact 5HOLD–2 of the auxiliary link was previously closed, ground is returned to the 6LBTA relay in the marker circuit. The 6LBTA operates and closes the contacts 6LBTA–1 to operate the 6RNG relay, which releases the number group circuit and returns a busy tone to the calling party in a manner will known in the art and as more fully set forth in the earlier cited Busch patent. 2.08

CONCLUSION

While the equipment of this invention has been shown in a particular embodiment wherein a privileged station is given access to a special service switching circuit having a single network appearance, it is to be understood that such an embodiment is intended only to be illustrative of the present invention and that numerous other arrangements may be devised by those skilled in the art without departing from the spirit and scope of the invention.

What I claim is:

1. In a switching system having switching network means and a special service line and trunk means both connected to said switching network means, the combination comprising
a special service circuit connected to a single appearance on said switching network means,
means for establishing a connection from said trunk means to said special service circuit network means appearance in response to said special service line being busy, and
auxiliary link means distinct from said switching network means for directly connecting said special service line to said special service circuit.

2. In a switching system, the combination in accordance with claim 1 further comprising means responsive to said special service line for enabling said auxiliary link means.

3. In a telephone switching system, a switching network,
a plurality of lines each having a single line appearance on said network,
a plurality of special service switching circuits each having a single line appearance on said network,
means for connecting any one of said special service switching circuits to a called first one of said lines, and
control means responsive to a predetermined state of said called first one of said lines for enabling said connecting means.

4. The combination set forth in claim 3 further comprising
a station connected to said first one of said lines and including selectively operable signaling means, and
call completion means for completing calling connections through to said station via said one special service circuit; said special service switching circuits each comprising means controlled by said selectively operable signaling means for enabling said call completion means.

5. The combination set forth in claim 3 wherein said predetermined state of said first one of said lines is constituted by the busy condition of said first one of said lines.

6. The combination set forth in claim 5 further comprising auxiliary means exclusively associated with said first one of said lines and operable to detect and register the said busy condition of said first one of said lines, and
wherein said control means is enabled by said auxiliary means in response to an incoming connection directed to said first one of said lines.

7. The combination set forth in claim 3 wherein said one special service switching circuit comprises means responsive to the enabling of said connecting means for impressing an electrical signal upon said first one of said lines.

8. The combination set forth in claim 3 wherein each said line appearance is assigned a unique designation,
means responsive to an incoming connection directed to said first one of said lines for detecting and registering the said designation of said first one of said lines,
said control means comprising means responsive to said predetermined state of said first one of said lines for substituting in said detecting and registering means the designation of a particular special service circuit line appearance, and
means for completing said incoming connection to said particular special service circuit line appearance.

9. The combination set forth in claim 8 wherein each said special service circuit comprises means for applying a momentary electrical signal upon said first one of said lines upon connection thereto, and
selectively operable means controlled by said first one of said lines for connecting said first one of said lines exclusively to said particular special service switching circuit.

10. The combination set forth in claim 9 wherein said particular special service switching circuit comprises means responsive to an on-hook state of said first one of said lines of predetermined duration for applying a series of electrical signals to said first one of said lines, and
means responsive to an off-hook state of said first one of said lines for inhibiting said applying means and for exclusively associating said first one of said lines with said particular switching circuit.

11. In a telephone system,
a switching network,
a special service line having a unique designation connected to a single appearance on said network,
a special service switching circuit having a unique designation connected to a single appearance on said network,
call completion means operative in response to registration of either of said unique designations for completing a calling connection to the network appearance corresponding thereto, and
means associated with said special service line network appearance operative in response to a predetermined state of said special service line for substituting in said call completion means the said unique designation of said special service switching circuit network appearance.

12. The combination set forth in claim 11 further comprising link means responsive to the enabling of said substituting means for connecting said switching circuit to said special service line.

13. In a switching system,
a switching network,
a special service line having a single line appearance on said network and comprising selectively operable means for generating a discrete signal,
means having a single line appearance on said network for receiving an incoming call,
means responsive to an incoming call to said special service line when said line is busy with a first call for diverting said incoming call to the line appearance of said call receiving means, and
switching means separate from said switching network and responsive to said discrete signal for connecting said call receiving means to said special service line.

14. In a switching system,
the combination set forth in claim 13 further comprising means responsive to the diversion of an incoming call to said call receiving means for placing a tone on said special service line to indicate the existence of said incoming call.

15. In a switching system,
the combination set forth in claim 13 further comprising a station connected to said special service line, and wherein
said switching means includes means responsive to said discrete signal for placing a holding bridge on the said appearance of said special service line and for connecting the said incoming call through to said station.

16. In a switching system,
the combination set forth in claim 13 further comprising transmitting and receiving means selectively connectable to said special service line, and wherein
said discrete signal comprises the sequential disconnection from said line and reconnection to said line for said transmitting and receiving means.

17. In a switching system,
the combination set forth in claim 16 further comprising timing means enabled upon the passage of a predetermined time interval between said disconnection and said reconnection of said transmitting and said receiving means for releasing the said connection to said call receiving means.

18. In a switching system, the combination set forth in claim 13 wherein said selectively operable means comprises a subset connected to said special service line operative to generate said discrete signal by an on-hook condition of said subset followed by an off-hook condition of said subset, and timing means enabled in response to said on-hook condition for releasing said incoming call after a predetermined interval, and means operative in response to said off-hook condition for inhibiting said timing means.

19. In a telephone system, a plurality of special service lines each having a regular appearance and each terminated by a subset, indicating means associated with each of said lines for switching from a first state to a second state when the associated said regular appearance is in use, a plurality of call receiving means each having an auxiliary line appearance, means responsive to a particular indicating means being in said second state for directing a call incoming to a called special service line from the called special service line associated with said particular indicating means to a selected one of said call receiving means, means separate from said switching network for connecting said selected call receiving means to said called special service line and for applying a tone to said called line to indicate the presence of said incoming call, and means responsive to a discrete signal from said called line subset for connecting said incoming call through said call receiving means to said subset.

20. In a telephone system, the combination set forth in claim 19, wherein said means for applying a tone to said called line includes timing means enabled upon the passage of a first predetermined interval of time for inhibiting said tone applying means and upon the passage of a second predetermined interval of time for reapplying said tone to said called line, and means responsive to the disconnection of said subset from said called line for disabling said timing means.

21. In a telephone system, the combination set forth in claim 20 further comprising a source of ringing potential, and means responsive to the disconnection of said subset from said called line for applying said source of ringing potential to said called line.